United States Patent
Palmer et al.

(10) Patent No.: US 7,865,275 B2
(45) Date of Patent: Jan. 4, 2011

(54) METHOD AND APPARATUS FOR CONTROLLING AN ELECTRIC VEHICLE FUNCTION

(75) Inventors: Ian Palmer, Christchurch (NZ); Richard Rodgers, Christchurch (NZ); Piers Seed, Christchurch (NZ)

(73) Assignee: Dynamic Controls Limited, Christchurch (NZ)

( * ) Notice: Subject to any disclaimer, the term of this patent is extended or adjusted under 35 U.S.C. 154(b) by 0 days.

(21) Appl. No.: 10/962,273

(22) Filed: Oct. 8, 2004

(65) Prior Publication Data
US 2005/0085962 A1 Apr. 21, 2005

(30) Foreign Application Priority Data
Oct. 10, 2003 (NZ) .................. 528823

(51) Int. Cl.
*G06F 17/00* (2006.01)
(52) U.S. Cl. .............. 701/22; 310/68 B; 310/80; 310/116; 180/6.5
(58) Field of Classification Search .............. 701/22, 701/1; 180/65.1, 65.3, 65.8, 216, 374, 7.1, 180/6.5; 280/250.1; 310/68 B, 80, 116
See application file for complete search history.

(56) References Cited

U.S. PATENT DOCUMENTS

| | | | | |
|---|---|---|---|---|
| 4,059,786 A * | 11/1977 | Jones et al. | ................... | 318/17 |
| 4,207,959 A * | 6/1980 | Youdin et al. | ............... | 180/167 |
| 4,566,707 A * | 1/1986 | Nitzberg | ..................... | 180/8.2 |
| 4,634,941 A * | 1/1987 | Klimo | ........................ | 318/139 |
| 4,672,375 A * | 6/1987 | Mochida et al. | ............ | 340/5.72 |
| 5,033,000 A * | 7/1991 | Littlejohn et al. | ............ | 701/36 |
| 5,555,949 A * | 9/1996 | Stallard et al. | ............... | 180/6.5 |
| 5,799,258 A * | 8/1998 | Fidanza et al. | ................. | 701/1 |
| 5,812,978 A * | 9/1998 | Nolan | ........................ | 704/275 |
| 5,923,096 A * | 7/1999 | Manak | ....................... | 307/10.1 |
| 6,385,522 B1 * | 5/2002 | Pugh | .......................... | 701/70 |
| 6,491,122 B2 * | 12/2002 | Leitner et al. | ............. | 180/65.8 |
| 6,655,483 B2 * | 12/2003 | Hayashi | ...................... | 180/65.1 |
| 2002/0019686 A1* | 2/2002 | Ulrich et al. | ................... | 701/1 |
| 2003/0020342 A1* | 1/2003 | Takeuchi | .................. | 310/68 B |

* cited by examiner

*Primary Examiner*—Tuan C To
(74) *Attorney, Agent, or Firm*—Snell & Wilmer LLP

(57) ABSTRACT

A method and controller for controlling electric vehicles wherein an output level to an output device is determined on the basis of timing information of input timing data. In one embodiment the timing data is provided on the basis of the duration of one or more user input device, such as one or more buttons. Different algorithms may be applied depending upon the duration of activation of the input device. An electric vehicle including the controller is also disclosed.

8 Claims, 9 Drawing Sheets

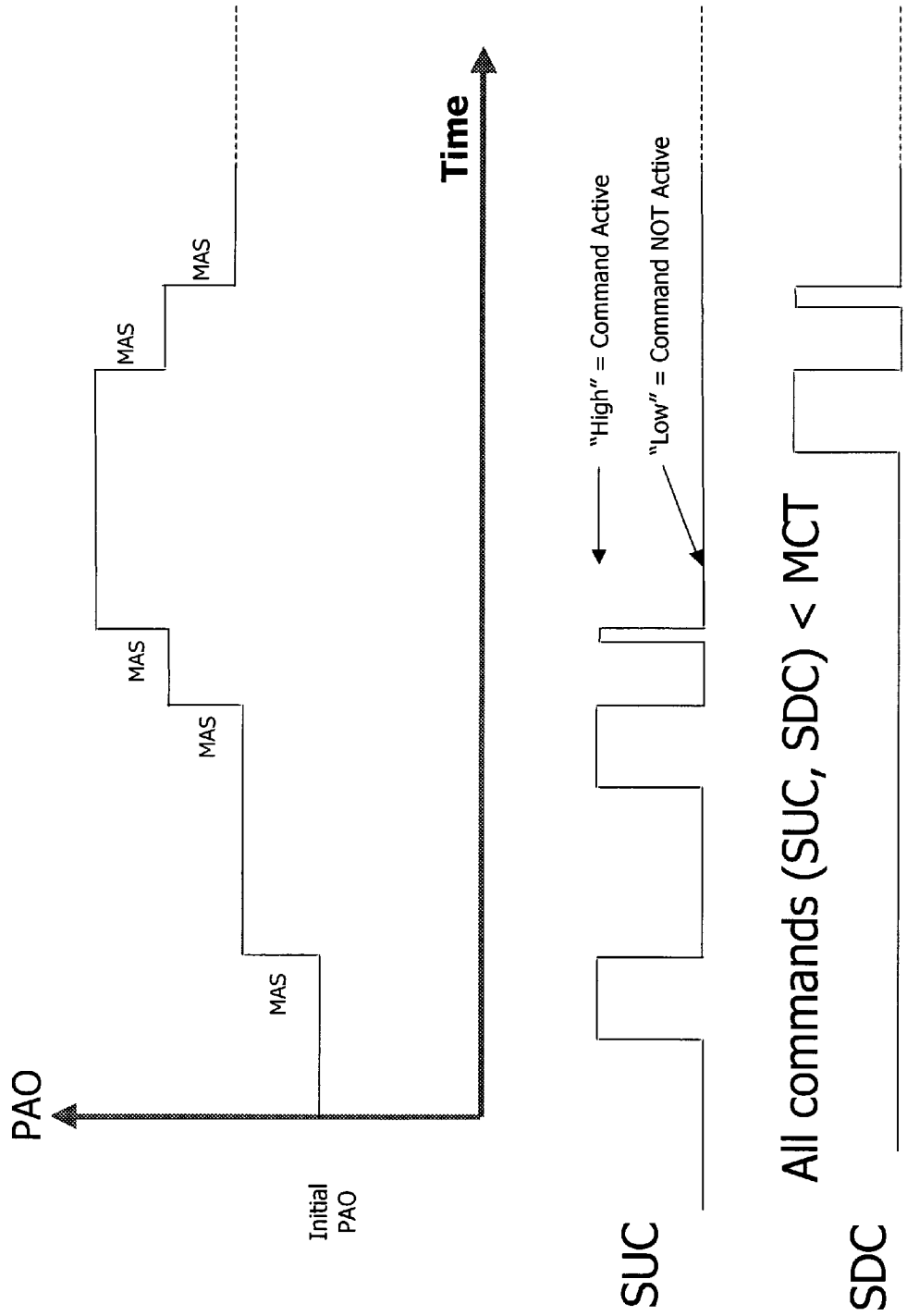
Figure 4- Showing Major Step Algorithm 1

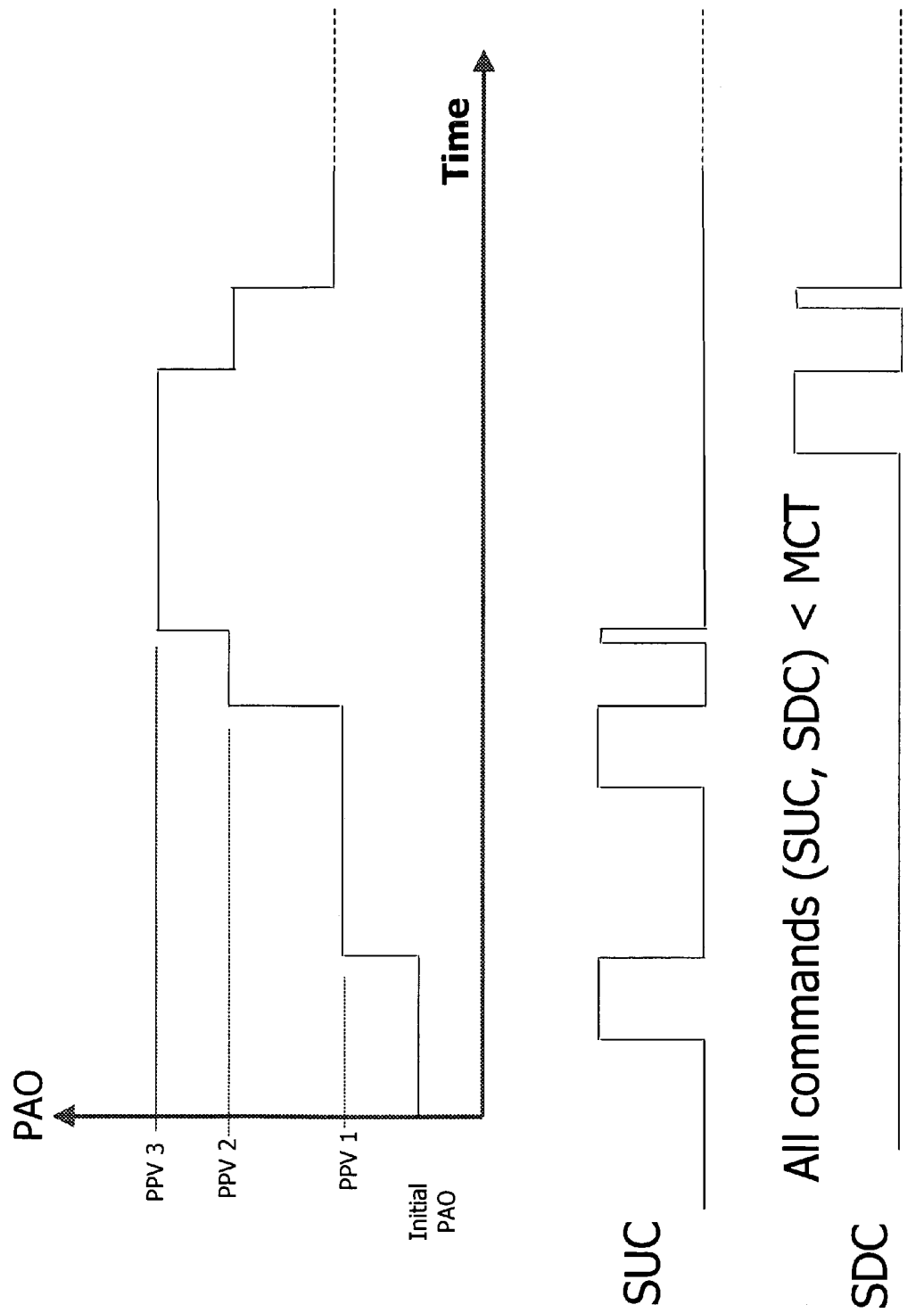
Figure 5 - Showing Major Step Algorithm 2

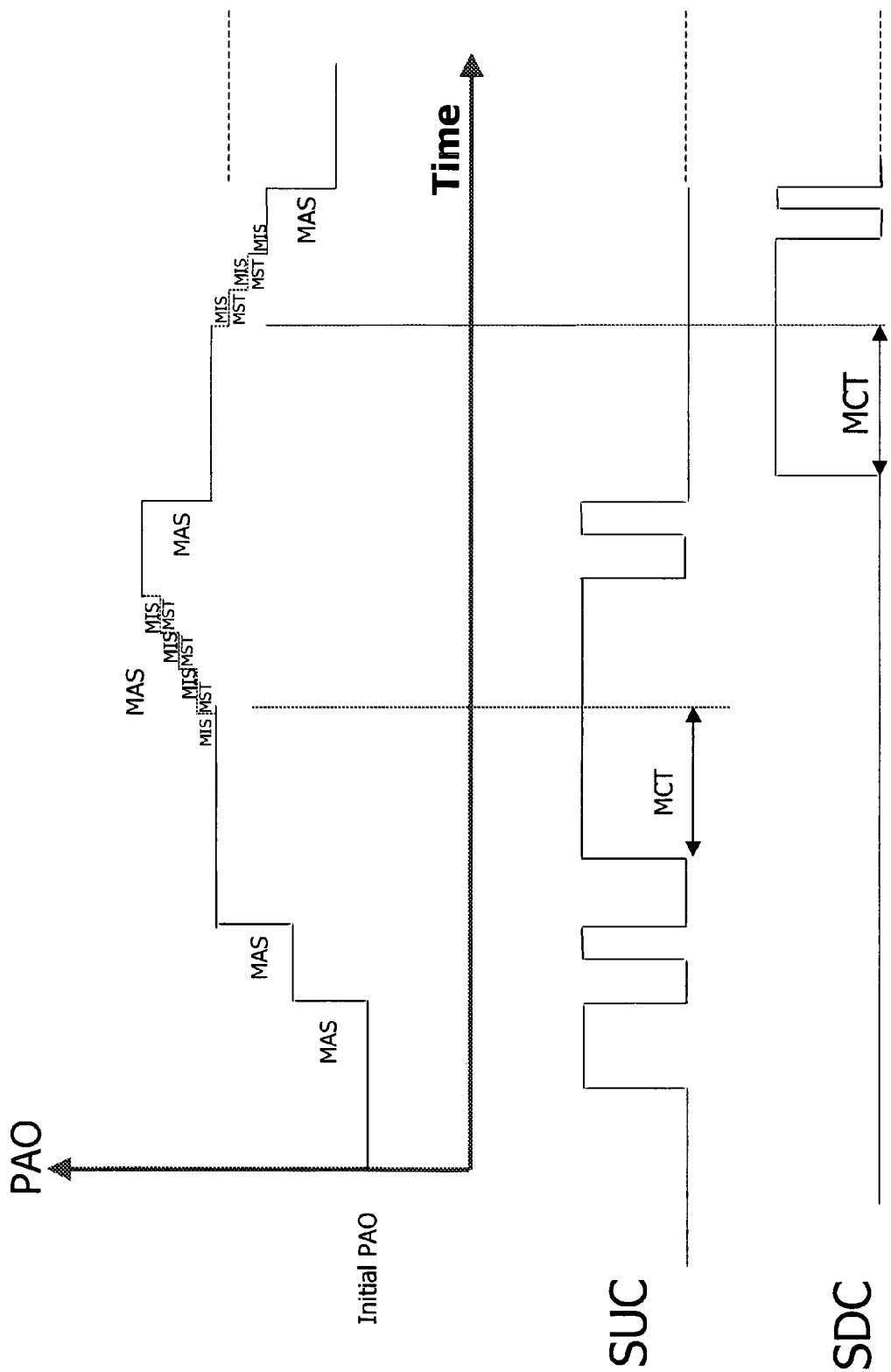
Figure 6 - Showing Minor Step Algorithm 1

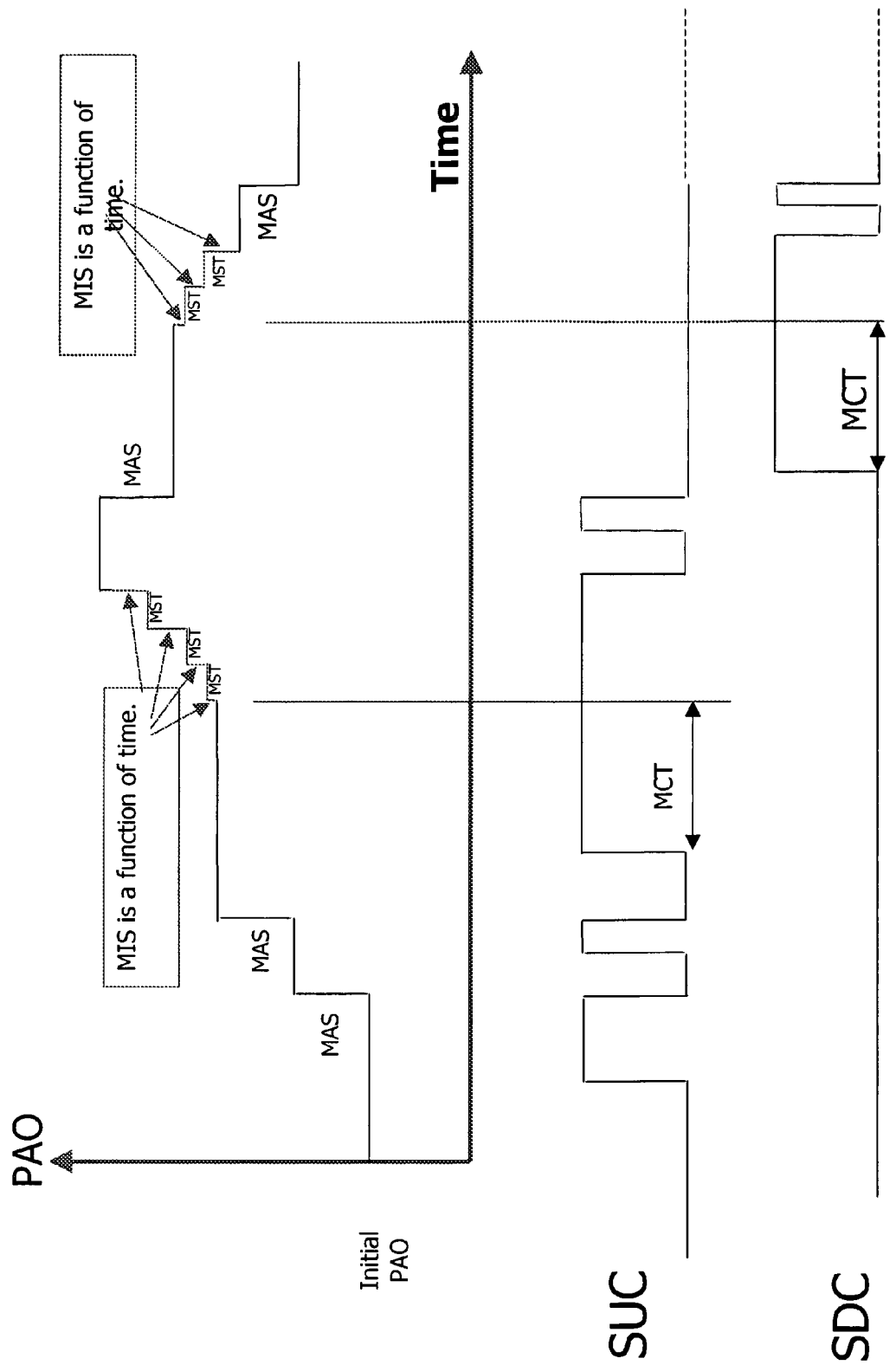
Figure 7- Showing Minor Step Algorithm 2

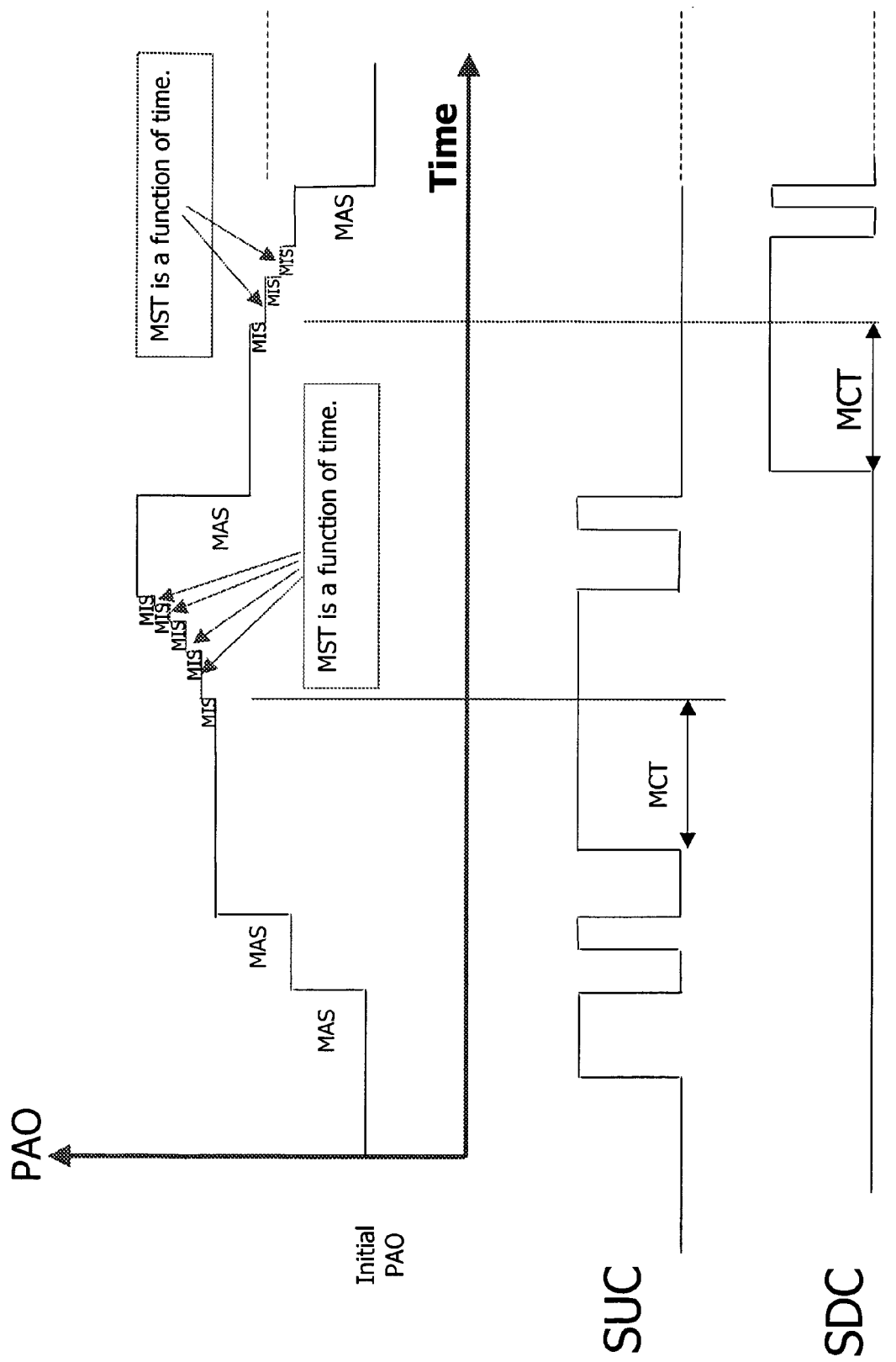
Figure 8 - Showing Minor Step Algorithm 3

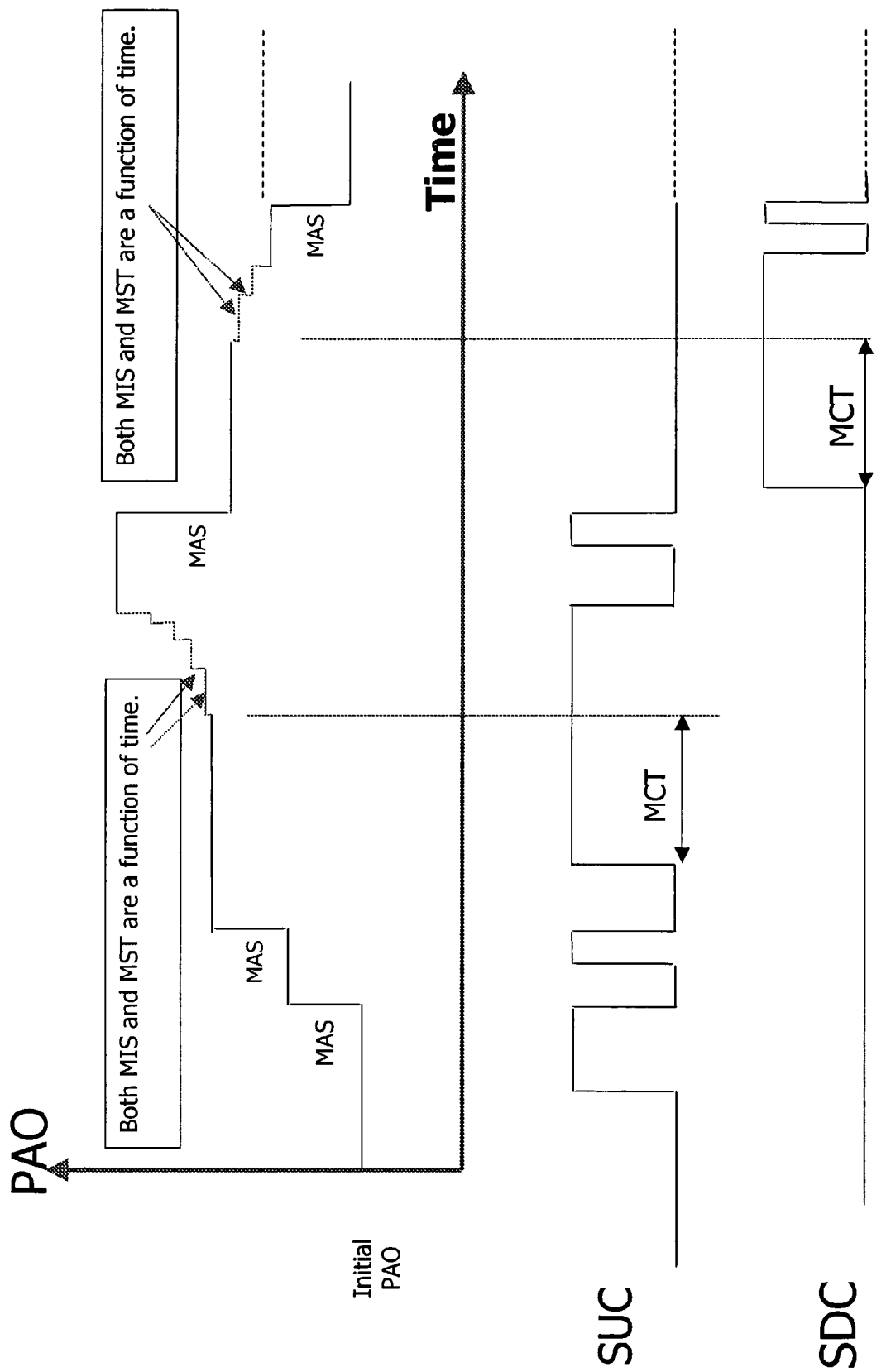
Figure 9 - Showing Minor Step Algorithm 4

METHOD AND APPARATUS FOR CONTROLLING AN ELECTRIC VEHICLE FUNCTION

CROSS-REFERENCE TO RELATED APPLICATIONS

This application claims priority of New Zealand Patent Application No. 528823 filed on Oct. 10, 2003.

FIELD OF THE INVENTION

The invention relates to control of electric vehicles, such as wheelchairs, and particularly to the use of digital input devices to emulate analog control input devices. A typical example would be the use of buttons to replace the speed potentiometer traditionally used to control of speed of an electric vehicle.

BACKGROUND OF THE INVENTION

Electric vehicles (e.g., power wheelchairs and scooters) have a number of controls by which a user can select options that influence the control of the vehicle.

Some of these are "switch" type controls, to control things that can be in one state or another. Typical examples would be the "POWER ON/OFF" switch, and "HEADLIGHT ON/OFF" switch.

Other controls are "analog" type controls, which control things that can be in a wide range of states, and ideally an infinite number of states. Typical examples would be the "THROTTLE", by which the user can select any speed between zero and top speed, and the "MAXIMUM SPEED" control, which allows the user to set the top speed to suit a particular environment (e.g., indoors or outdoors).

In the electric vehicle industry "Analog" controls are traditionally implemented using continuously variable resistors ("potentiometers"). These give an infinite amount of resolution but are expensive, impose design difficulties and restrictions, and are prone to physical abuse.

More recently some manufacturers have used "UP" and "DOWN" switches or buttons to approximate analog controls. When used to implement a "MAXIMUM SPEED" control, for instance, these buttons can be used to step up/down to one of a small number (typically 5) preset maximum speed choices. The choice currently selected is normally indicated by a visual indicator (e.g., LED). Often however this small choice of maximum speed options does not allow fine enough control, so that (for instance) it becomes difficult for a user to drive the chair at the same speed as someone walking beside them. The only way around this is to allow more choices of top speed, which means an impractical amount of button pressing to select the required top speed.

The display to indicate which of these many top speeds is currently selected is also problematical, requiring a large and/or expensive display.

An object of the invention is to provide a technique that allows data from push buttons, or other binary input devices, to be used to closely approximate an "analog" control input device, or at least to provide the public with a useful alternative.

SUMMARY OF THE INVENTION

A first aspect of the invention provides a method of controlling an electric vehicle function, the method including: receiving input data; obtaining timing information from the input data; selecting an output level in accordance with the timing information; and controlling the electric vehicle function in accordance with the output level.

A second aspect of the invention provides a controller for controlling a function of an electric vehicle comprising:
 a. a port for receiving input data;
 b. a processor for analyzing input data to obtain timing information from the input data and determining an output level in accordance with the timing information; and
 c. an output port for outputting the output level to an output device.

The invention is suitable for use in a variety of electric vehicles, such as the "Glide Series 6" power chair or the "Plega Traveller" scooter.

Further aspects of the invention will become apparent from the following description which is given by way of non limiting example only.

BRIEF DESCRIPTION OF THE DRAWINGS

FIG. 4—shows a major step algorithm according to a first embodiment;

FIG. 5—shows a major step algorithm according to a second embodiment;

FIG. 6—shows a minor step algorithm according to a first embodiment;

FIG. 7—shows a minor step algorithm according to a second embodiment;

FIG. 8—shows a minor step algorithm according to a third embodiment; and

FIG. 9—shows a minor step algorithm according to a fourth embodiment.

DETAILED DESCRIPTION

Examples of the invention will be apparent from the following description which is described with reference to the accompanying drawings.

Figure 1:
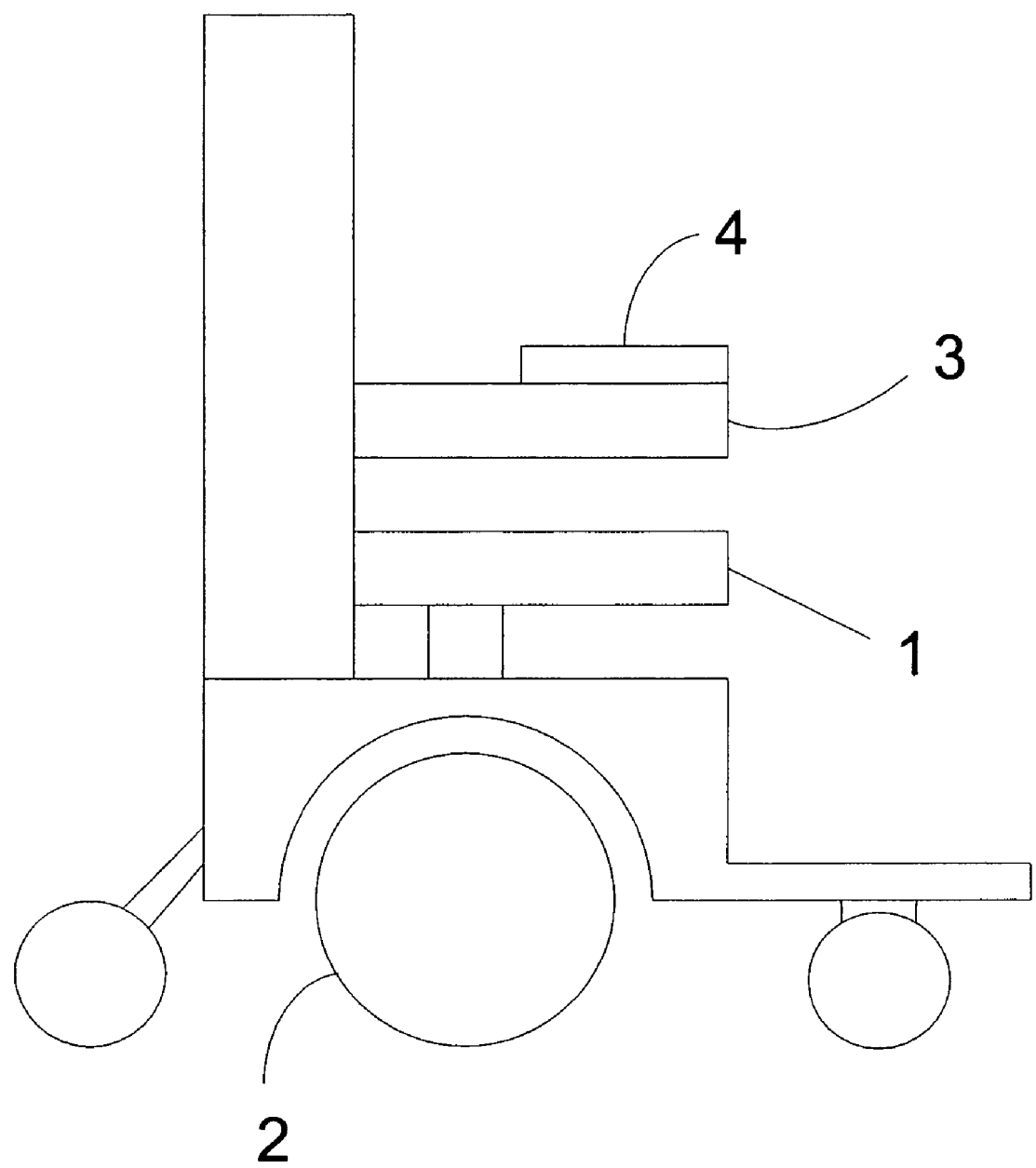
FIG. 1—is a schematic diagram of an electric vehicle according to one embodiment.

FIG. 1 shows an electric power wheelchair. The wheelchair has an adjustable seat 1, at least one driven wheel 2, and an arm rest 3 carrying a user interface 4.

Figure 2:
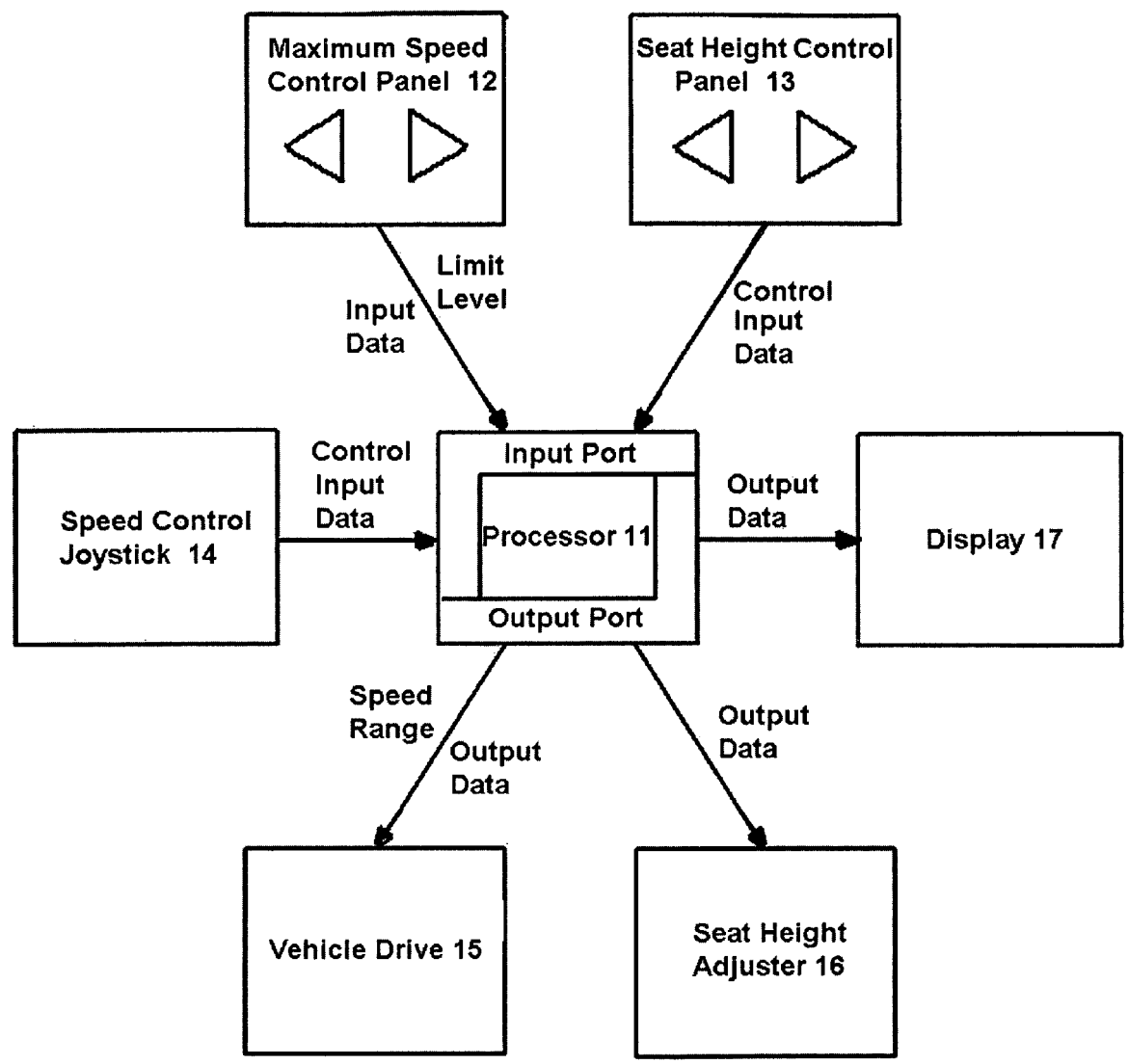
FIG. 2—is a block diagram of the vehicle control system according to one embodiment.

FIG. 2 shows a controller according to a first embodiment suitable for controlling the vehicle shown in FIG. 1. The controller includes a processor 11. A maximum speed control panel 12 and seat height control panel 13 are connected to input ports of the processor 11 and the maximum speed control panel 12 provides limit level input data to the processor 11. Each panel has a pair of up/down buttons. Outputs from output ports of the processor are directed to a vehicle drive 15, seat height adjuster 16, and display 17. The vehicle drive 15 is controlled by a joystick 14 which provides speed and direction control commands to the processor 11. The control panels 12, 13, joystick 14 and display 17 are all part of the user interface 4 mounted on the arm rest 3.

Figure 3:
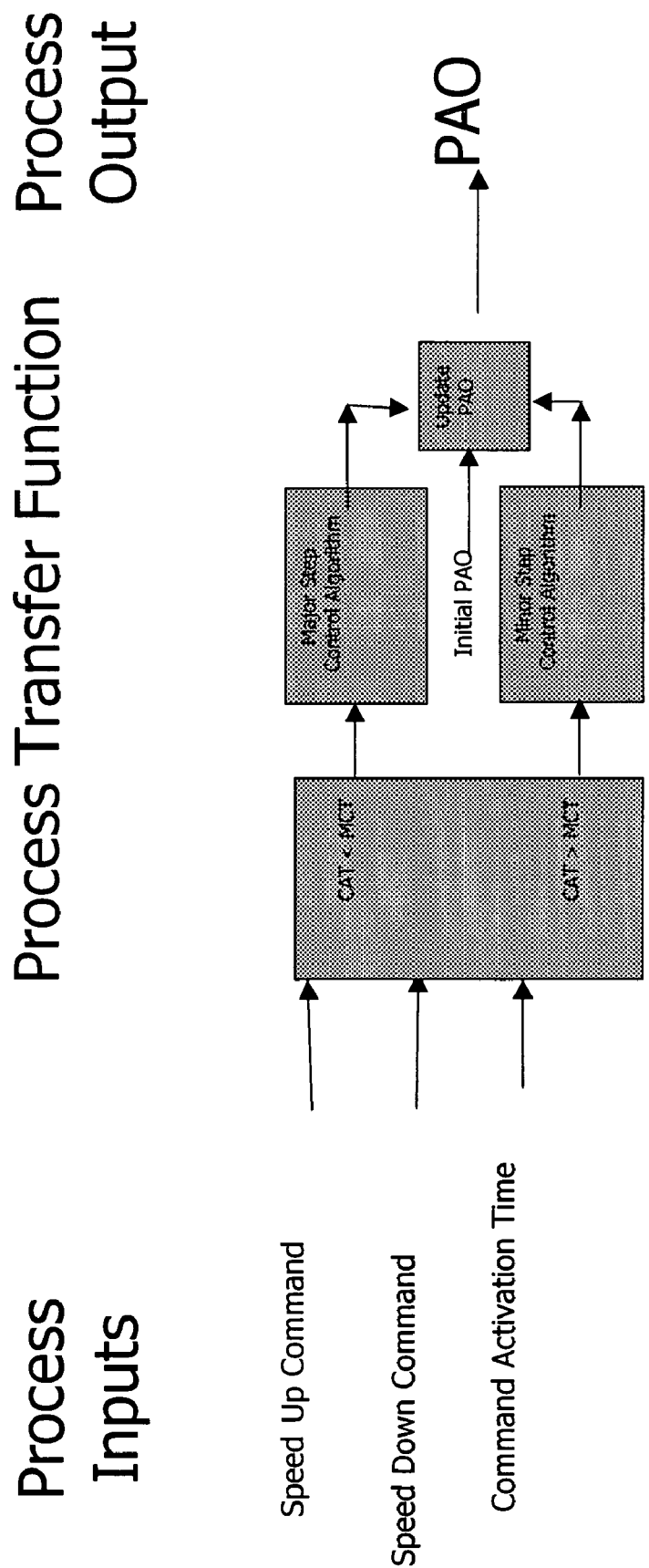
FIG. 3—shows a process for setting a pseudo analog output according to one embodiment.

According to one embodiment the processor 11 processes up/down commands from the maximum speed control panel 12 as shown schematically in FIG. 3. When the down button is depressed, the processor receives a "Speed Down Command" (SDC). When the up button is depressed, the processor receives a "Speed Up Command" (SUC). The processor monitors the length of time that the up or down button is depressed, and generates a "Command Activation Time" (CAT) which is input to the process.

The processor first generates an "Initial Pseudo Analog Output" (IPAO). Depending on the CAT, the processor increments or decrements the IPAO in accordance with a Minor Step Control Algorithm or a Major Step Control Algorithm, as discussed in further detail below. The output of the process is a "Pseudo Analog Output" (PAO) which is used to control the maximum speed of the vehicle.

Definition of Terms

The Major and Minor Step algorithms employ various parameters which will first be described below.

1) "Major Step" (MAS): A nominally large incremental change in the value of PAO MAS will generally be programmable to suit the application.

2) "Minor Step" (MIS): A nominally small incremental change in value of "PAO". MIS will generally be programmable to suit the application.

3) "Preset PAO value" (PPV): One or more (up to "N") absolute PAO values. PPV-1 to PPV-N will generally be programmable values.

4) "Major Step Control Algorithm" (MaCA): The mathematical/logical expression that defines how the system inputs (SUC/SDC/CAT) are processed to change the PAO value by a Major Step.

5) "Minor Step Control Algorithm" (MiCA): The mathematical/logical expression that defines how the system inputs (SUC/SDC/CAT) are processed to change the PAO value by a Minor Step.

6) "Minor Step Time" (MST): Defines the time between successive Minor Step increments/decrements. MST will generally be programmable to suit the application.

7) "Mode Change Time" (MCT): A constant that defines which of the "Major Step Control Algorithm" or "Minor Step Control Algorithm" is active at any time. MCT is typically of the order of 0.5 seconds.

Two exemplary Minor and Major Control Algorithms will now be described with reference to FIGS. 4 to 9.

Major Control Algorithm 1 (FIG. 4)

If SUC (SDC) is active for less than MCT, then increment (decrement) PAO by the value MAS.

If SUC (SDC) is active for greater than MCT, then increment (decrement) PAO according to the MiCA.

Major Control Algorithm 2 (FIG. 5)

If SUC (SDC) is active for less than MCT, then increase (decrease) PAO to the next higher (lower) PPV.

If SUC (SDC) is active for greater than MCT, then increment (decrement) PAO according to the MiCA.

Minor Control Algorithm 1 (FIG. 6)

$$PAO=IPAO+K1*[(CAT-MCT)/MST]*MIS$$

Where K1 is a constant, which may be programmable.

In this case, the PAO ramps up or down at a linear rate. The value of MIS is typically programmed to be $1/10^{th}$ of MAS, although other proportions may be chosen if required.

Minor Control Algorithm 2 (FIG. 7)

$$PAO=IPAO+MST*MIS(Time)$$

Where MIS(Time) means MIS is any mathematical function of Time [where Time=(CAT−MCT)]

In this case, the function MIS is a non-linear function.

Minor Control Algorithm 3 (FIG. 8)

$$PAO=IPAO+MST(Time)*MIS$$

Where MST(Time) means MST is any mathematical function of Time [where Time=(CAT−MCT)]

In this case, the function MST is a non-linear function.

Minor Control Algorithm 3 (FIG. 9)

$$PAO=IPAO+MST(Time)*MIS(Time)$$

Where MIS(Time) means MIS is any mathematical function of Time [where Time=(CAT−MCT)] and MST(Time) means MST is any mathematical function of Time [where Time=(CAT−MCT)]

In this case, both MIS and MST are non-linear functions.

When the maximum speed has been set using one of the control algorithms described above, the vehicle drive 15 can then increase the speed of the vehicle up to the maximum speed under control of the joystick 14.

The maximum speed level is displayed on display 17. By way of example, the display may consist of a row of light emitting diodes (LEDs), one diode for each MAS level. When the PAO is incremented or decremented by MAS, then one of the LEDs is turned on or off The display of minor steps within major steps may either be ignored or can be approximated by an appropriate varying in intensity of the latest LED to be turned on.

A similar process (not shown) can also be applied to the control of any number of functions, for instance control of the height of the vehicle, by way of input from the seat height control panel 13. Alternatively a pseudo-analog controller can be used to set a "sensitivity" or "response" setting that determines the acceleration and/or deceleration characteristics of the vehicle.

It will be apparent to a skilled addressee from the description above and the accompanying drawings that a means for implementation of analog type control inputs to electronic controllers using these functions can be built to power vehicles, such as wheelchairs, scooters and other electric vehicles, by means of two digital type inputs and an appropriate display. It will be appreciated that a different number of buttons could be employed or that a variety of types of digital input devices may be employed.

The specific algorithms and control procedures allow the means for implementation as hereinbefore described to provide both coarse and fine adjustment using a single adjustment mechanism.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

We claim:

1. A controller configured to control a function of an electric vehicle comprising:
    an input port configured to receive binary limit level input data;
    the input port further configured to receive control input data;
    a processor configured to analyze binary limit level input data to obtain timing information from the binary limit level input data and determine a maximum speed in accordance with the timing information, wherein the processor determines the maximum speed on the basis of the duration of an activation period of the timing information, and wherein the processor determines the maximum speed in accordance with a first control algorithm if the duration of the activation period is less than a threshold value and the maximum speed determined in accordance with a second control algorithm if the duration of the activation period is greater than the threshold value; and an output port configured to output a speed range to an output device based on the control input data, wherein the speed range is limited in accordance with the maximum speed.

2. A controller as claimed in claim 1 wherein the first control algorithm varies the maximum speed by larger steps than the second control algorithm.

3. A controller as claimed in claim 2 wherein the steps of the first control algorithm vary in accordance with a predetermined sequence.

4. A controller as claimed in claim 2 wherein the steps of the first control algorithm increase exponentially.

5. An electric vehicle including:
   a controller as claimed in claim 1;
   an input device configured to provide input data to the input data port of the controller; and
   an actuator.

6. An electric vehicle as claimed in claim 5 wherein the input device consists of one or more buttons.

7. An electric vehicle as claimed in claim 6 wherein the input device consists of a pair of buttons.

8. An electric vehicle as claimed in claim 5 wherein the actuator is a vehicle drive.

* * * * *